US 8,856,216 B2

(12) United States Patent
Kuruvilla et al.

(10) Patent No.: US 8,856,216 B2
(45) Date of Patent: Oct. 7, 2014

(54) METHOD AND APPARATUS FOR EFFICIENTLY PERFORMING FILE SERVICES USING CLOUD COMPUTING

(75) Inventors: Ashok Mathew Kuruvilla, Kerala (IN); Inder Jeet Singh, Udhampur (IN)

(73) Assignee: Adobe Systems Incorporated, San Jose, CA (US)

( * ) Notice: Subject to any disclaimer, the term of this patent is extended or adjusted under 35 U.S.C. 154(b) by 58 days.

(21) Appl. No.: 13/370,677

(22) Filed: Feb. 10, 2012

(65) Prior Publication Data
US 2013/0212152 A1  Aug. 15, 2013

(51) Int. Cl.
*G06F 15/16* (2006.01)

(52) U.S. Cl.
USPC ....................................... 709/203

(58) Field of Classification Search
CPC . H04L 12/581; H04L 29/06; H04L 29/06027; H04L 41/5048; H04L 41/5096; H04L 45/02; H04L 49/70; H04L 51/04; H04L 65/4076; H04L 67/00; H04L 67/02; H04L 67/1002; H04L 67/36; H04L 67/42; H04L 69/24
USPC ....................................... 709/203
See application file for complete search history.

(56) References Cited

U.S. PATENT DOCUMENTS 5,987,506 A * 11/1999 Carter et al. ................... 709/213
7,703,012 B2    4/2010 Park et al.
8,103,953 B2 *  1/2012 McKellar et al. .............. 715/234
2007/0286121 A1* 12/2007 Kolakowski et al. ......... 370/329
2009/0327448 A1  12/2009 Williams et al.
2012/0311156 A1* 12/2012 DeJana et al. ................ 709/226

OTHER PUBLICATIONS

"Try This: ge.tt. Simply a better option for cloud-based file sharing", Brad McCarty, downloaded on May 4, 2012 from The Next Web website—http://thenextweb.com/apps/2010/11/26/try-this-ge-tt-simply-a-better-option-for-cloud-based-file-sharing/, 3 pages.
"Partial Upload Using Content-Range", Ajay Panwar, downloaded on May 7, 2012 from http://developer.nirvanix.com/forums/t/456.aspx, 3 pages.
"How to Create Empty File With Specific Size?", downloaded on May 7, 2012 from http://www.softwaretipspalace.com/how to features/software/how to create empty file with specific size.html, 2 pages.

* cited by examiner

*Primary Examiner* — Kevin Bates
*Assistant Examiner* — Ronak Patel
(74) *Attorney, Agent, or Firm* — Moser Taboada

(57) ABSTRACT

A method and apparatus for performing file services using cloud computing comprises receiving, from a client computer, at least one parameter of a file resident on the client computer and a task to be performed upon the file. In view of the task, creating a virtual file based on the at least one parameter of the file, and dividing the virtual file into a plurality of data chunks. The method identifies a byte range within the virtual file associated with the task and at least one corresponding data chunk from the plurality of data chunks that is within the byte range. The method requests the corresponding data chunk(s) from the client computer, receives the corresponding data chunk(s) from the client, processes the corresponding data chunk(s) in accordance with the task, and sends the processed corresponding data chunk(s) to the client computer.

19 Claims, 3 Drawing Sheets

METHOD AND APPARATUS FOR EFFICIENTLY PERFORMING FILE SERVICES USING CLOUD COMPUTING

BACKGROUND OF THE INVENTION

1. Field of the Invention

Embodiments of the present invention generally relate to cloud computing and, more particularly, to a method and apparatus for efficiently performing file services using cloud computing.

2. Description of the Related Art

With the advent of cloud computing, computational tasks may utilize the processing power of remote computers (i.e., servers). Files are stored locally on a client computer, while tasks (e.g., editing) is performed by application software executing on a cloud-based server. Many of these tasks are associated with the processing of specific information contained in files that are supplied to the cloud-based server, for example, by a web client, such as a browser. For example, if a task requires an edit to a particular page of a document, the entire document is sent to the server, the task is then applied to the document and the processed document returned to the client.

Conventional techniques require a client computer to upload an entire file onto the cloud-based server, even when the server may not require the entire file to complete a task or an atomic subtask. As a result, the overall system suffers from unnecessary network traffic, higher bandwidth utilization, performance degradation, poor response time and the like.

Therefore, there is a need for an improved method and apparatus for efficiently performing file services using cloud computing.

SUMMARY OF THE INVENTION

Embodiments of the present invention generally relate to a method and apparatus for performing file services using cloud computing. In an embodiment, a computer implemented method of performing file services using cloud computing comprises receiving, from a client computer, at least one parameter of a file resident on the client computer and a task to be performed upon the file. In view of the task, creating a virtual file based on the at least one parameter of the file and dividing the virtual file into a plurality of data chunks. The method identifies a byte range within the virtual file associated with the task and at least one corresponding data chunk from the plurality of data chunks that is within the byte range. The method requests the at least one corresponding data chunk from the client computer, receives the at least one corresponding data chunk from the client and processes at least one corresponding data chunk in accordance with the task. The processed at least one corresponding data chunk may be returned to the client for use as an incremental update of the file.

Figure 1:
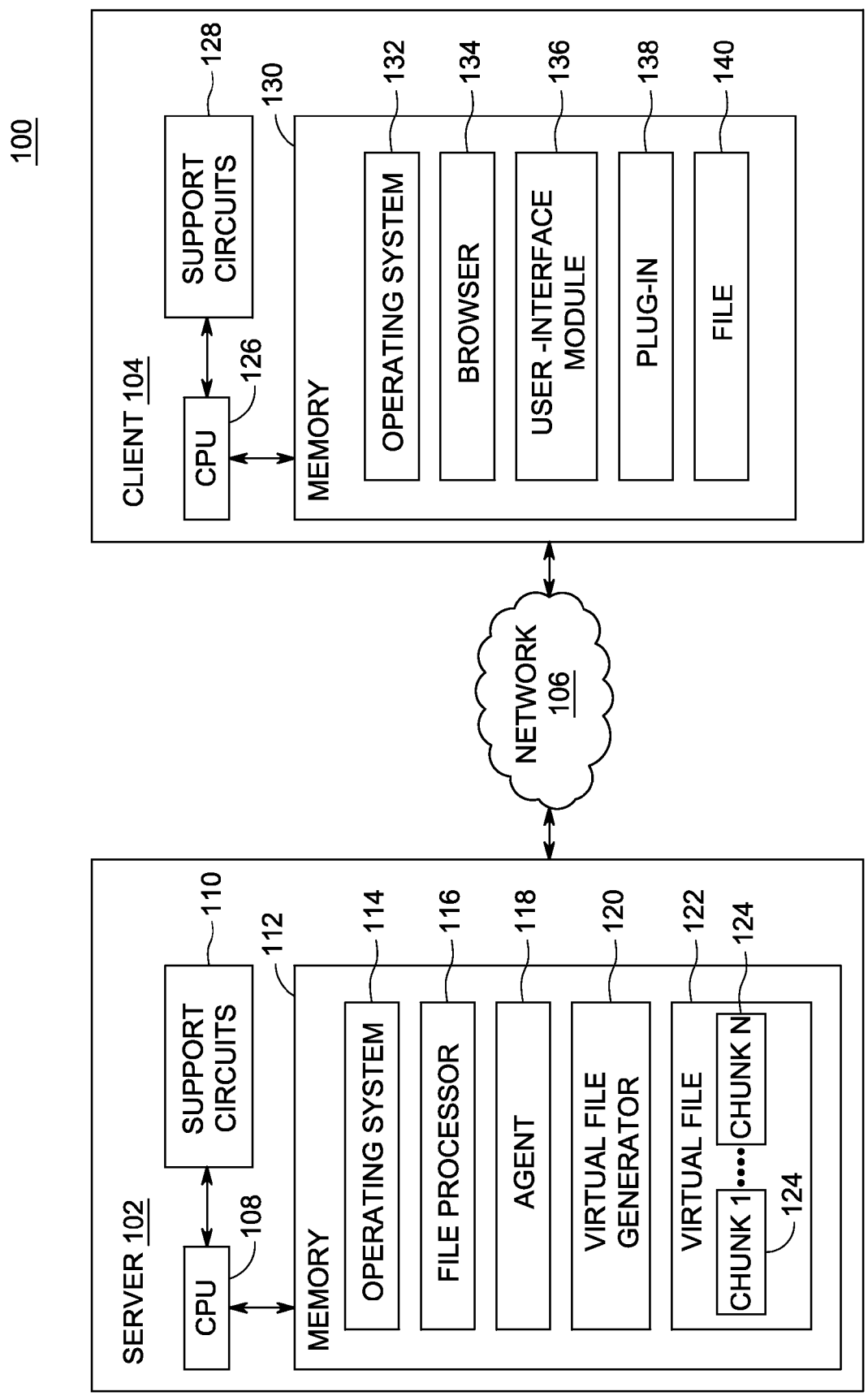
FIG. 1 depicts a system for performing file services using cloud computing, according to one or more embodiments.

While the method and apparatus is described herein by way of example for several embodiments and illustrative drawings, those skilled in the art will recognize that the method and apparatus for performing file services using cloud computing is not limited to the embodiments or drawings described. It should be understood, that the drawings and detailed description thereto are not intended to limit embodiments to the particular form disclosed. Rather, the intention is to cover all modifications, equivalents and alternatives falling within the spirit and scope of the method and apparatus for performing file services using cloud computing as defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Embodiments of the present invention comprise a method and apparatus for performing file services using cloud computing. The embodiments perform file services efficiently using cloud computing. A cloud computing system comprises at least one cloud-based server (hereinafter "server") and at least one client computer (hereinafter "client") coupled to one another by a communications network. The client stores at least one file and uses computing services provided by the server to process the at least one file. In one embodiment, the client sends a task request (e.g., apply an edit to a specific page) and a parameter of the file (e.g., a document) to the server. The server creates a virtual file that represents a data extent of the file and only requests from the client specific portions (chunks) of the file within the extent that are relevant to the task. The client sends only the relevant portions to the server for processing and the server returns only the relevant portions after processing for use by the client as incremental updates. As such, the embodiment conserves network bandwidth in all communication between the client and server and enables the server to quickly perform the task.

Various embodiments of an apparatus and method for performing file services using cloud computing are described. In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

FIG. 1 depicts a system for performing file services using cloud computing, according to one or more embodiments. The system 100 comprises a server 102 and a client 104 coupled to each other through a network 106.

The server 102 is a type of computing device known to one of ordinary skill in the art that is used for providing computing services within the cloud, e.g., a blade server, virtual machine, and the like. The CPU 108 may comprise one or more commercially available microprocessors or microcontrollers that facilitate data processing and storage. The various support circuits 110 facilitate the operation of the CPU 108 and include one or more clock circuits, power supplies, cache, input/output circuits, displays, and the like. The memory 112 comprises at least one of Read Only Memory (ROM), Random Access Memory (RAM), disk drive storage, optical storage, removable storage and/or the like. The memory 112 comprises a operating system 114, a file processor 116, an agent 118, a virtual file generator 120, and a virtual file 122. The virtual file 122 is divided into multiple chunks, such as $chunk_1, chunk_2 \ldots chunk_N$.

The client 104 is a type of computing device (e.g., a laptop, a desktop, a Personal Digital Assistant (PDA), a tablet, a mobile phone and/or the like) known to one of ordinary skill in the art that uses cloud-based services. The CPU 126 may comprise one or more commercially available microprocessors or microcontrollers that facilitate data processing and storage. The various support circuits 128 facilitate the operation of the CPU 126 and include one or more clock circuits, power supplies, cache, input/output circuits, displays, and the like. The memory 130 comprises at least one of Read Only Memory (ROM), Random Access Memory (RAM), disk drive storage, optical storage, removable storage and/or the like. The memory 130 comprises an operating system 132, a browser 134, a user interface module 136, a plug-in 138, and a file 140.

The network 106 comprises a communication system that connects computers by wire, cable, fiber optic and/or wireless link facilitated by various types of well-known network elements, such as hubs, switches, routers, and the like. The network 106 may employ various well-known protocols to communicate information amongst the network resources. For example, the network 106 may be a part of the Internet or Intranet using various communications infrastructure, such as Ethernet, Wi-Fi, Wi-Max, General Packet Radio Service (GPRS), and the like.

According to some embodiments, the operating system (OS) 114 generally manages various computer resources (e.g., network resources, file processors, agents, virtual file generators and/or the like). The operating system 114 is configured to execute operations on one or more hardware and/or software modules, such as Network Interface Cards (NICs), hard disks, virtualization layers, firewalls and/or the like. In some embodiments, the operating system 114 may provide a virtual computing environment such that multiple "servers" may operate on a single hardware computing platform. For example, the agent 118, the file processor 116, the virtual file generator 120 call commands associated with the operating system 114 (i.e., native operating system commands) and/or an application executing on the server 102 to perform various operations, such as creating a virtual file, accessing a byte corresponding to a data chunk, processing the data chunk and/or the like.

According to some embodiments, the operating system (OS) 132 generally manages various computer resources (e.g., network resources, browsers, user-interface module, plug-in and/or the like). The operating system 132 is configured to execute operations on one or more hardware and/or software modules, such as Network Interface Cards (NICs), hard disks, virtualization layers, firewalls and/or the like. For example, the browser 134, the user-interface module 136, the plug-in 138 call commands associated with the operating system 132 (i.e., native operating system commands) to perform various operations, such as accessing file, transferring relevant bytes, rendering processed file data and/or the like.

According to some embodiments, the browser 134 accesses a file (i.e. the file 140) residing on the client 104. According to one or more embodiments, the browser 134 includes a software application for accessing Internet resources (e.g., domain names, Uniform Resource Locators (URLs), and/or the like) and displays contents associated with the Internet resources using the user interface module 136. The resources may further be identified through Uniform Resource Identifier (URI) and/or may be a web page, image, video, or other piece of content. The browser 134 may include, but are not limited to, Windows Internet Explorer (IE), Mozilla Firefox, Apple Safari, Google Chrome, Opera, Internet Explorer Mobile (IE), jB5, WebOS, Opera Mobile, and/or the like. The browser 134 further includes a browser component (not shown) configured to provide additional functionalities for the browser (e.g., an add-on, plug-in or extension that facilitates web browsing in accordance with one or more embodiments of the invention).

According to some embodiments, the agent 118 includes a software application facilitating communication between the client 104 (via the browser 134) and the server 102. The agent 118 receives at least one parameter of the file 140 in accordance with a file operation task. The file 140 may be a document (.pdf, .doc, .xls, and the like), image, video, audio, multimedia, and the like. In some embodiments, the parameter includes a file size, a file name, memory space extent, and related file parameters. The file operation task (as generated by a user) is performed on the file 140 resident on the client 104. For example, the task may involve some additions (e.g., edits, updates and the like) on Page 2 of a 100 page PDF file (of size 10 MB, for example). Through a user interface, a user may select a task to be performed within a document, such as a PDF, on a particular page, paragraph, image, portion of a video and the like.

According to some embodiments, the virtual file generator 120 creates a virtual file 122, that is, the virtual file 122 based on the at least one parameter of the file 140. The virtual file 122 represents the file 140 by having the same memory extent, file size and file name as the file 140. The virtual file generator 120 further divides the virtual file 122 into a plurality of data chunks 124, such as $chunk_1, chunk_2 \ldots chunk_N$. In some embodiments, the virtual file generator 120 logically divides the virtual file 122 into a plurality of data chunks that are mutually exclusive and jointly exhaustive to each other and the chunk size may be fixed or varied during the run time. In one embodiment, each chunk represents a range of memory space within the extent of the file 140.

According to some embodiments, the file processor 116 identifies a byte range associated with the file operation task and at least one corresponding data chunk from the plurality of data chunks 124. The agent 118 as per the file processor 116 requests the client 104 for the at least one chunk. As a result, the file processor 116 receives the at least one chunk from the client 104. According to some embodiments, the plug-in 138 and the browser 134 facilitates transferring the at least one chunk from the client 104 to the file processor 116 of the server 102. The browser 134 polls the server 102 to pull the notification for the chunks to be uploaded. Alternatively, WebSocket technology may be used to push the notification for the chunks to be uploaded. If the browser 134 receives the notification, the browser uses, for example, a HTML5 filereader API to read the desired chunk from the file and upload the chunk, for example, using XML.HttpRequest.

The file processor 116 processes the at least one chunk for executing the file operation task.

According to one or more embodiments, the user interface module 136 may be a Graphical User Interface (GUI), a Command Line Interface (CLI) and/or other user interface that facilitates communication with a user. The user interface module 136 enables a user to identify one or more portions of the file for processing, e.g., select a page, image, video, or audio of a document and select a task to apply to the selected portion.

Figure 2:
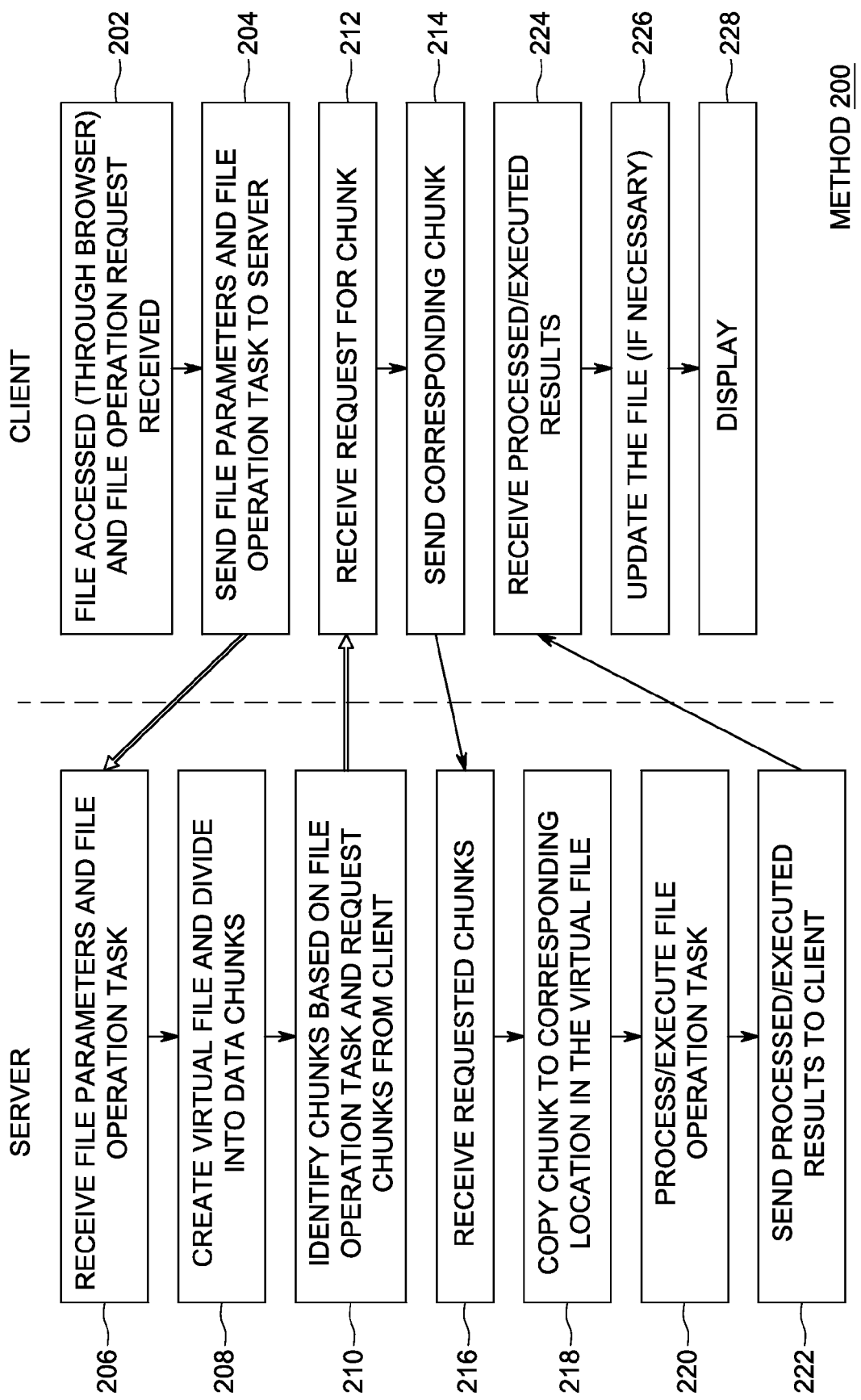
FIG. 2 depicts a flow diagram of a method for performing file services using cloud computing, according to one or more embodiments.

FIG. 2 depicts a flow diagram of a method for performing file services between a client and a server, according to one or more embodiments. The method 200 illustrates a detailed process flow between a client (i.e., the client 104) and a server (i.e., the server 102). FIG. 2 depicts a flow diagram of a method 200 for performing file services between the client 104 and the server 102.

The method 200 starts at step 202 at which, a file is accessed and a file operation request is received. In an embodiment, a file, e.g., the file 140 is accessed through a browser, e.g., the browser 134, when a file operation request received on the client 104 (i.e., a task is requested from a user). In other embodiments, the file is accessed using a desktop application, e.g., ADOBE® ACROBAT®. At step 204, file parameters and the file operation task are sent to a server. In some embodiments, a plug-in 138 sends the at least one parameter of the file 140 in accordance with the file operation task. The file operation task (as generated by a user) is performed on the file 140 resident on the client 104.

At step 206, the server receives the file parameters and the file operation task. In some embodiments, the agent 118 receives at least one parameter of the file 140 in accordance with the file operation task. At step 208, a virtual file is created to represent the file 140 and the virtual file is divided into chunks. In some embodiments, the virtual file generator 120 creates a virtual file, i.e., the virtual file 122 based on the at least one parameter of the file 140. The virtual file generator 120 further divides the virtual file 122 into the plurality of data chunks, such as $chunk_1, chunk_2 \ldots chunk_N$.

At step 210, the method 200 identifies chunks based on the file operation task and requests the chunks from the client. According to some embodiments, the file processor 116 identifies a byte range associated with the file operation task and at least one corresponding data chunk from the plurality of data chunks 124. The agent 118 then requests the client 104 for the at least one chunk. At step 212, the client receives a request for a chunk. At step 214, the client 104 sends the corresponding chunk to the server 102.

At step 216, the server 102 receives the requested chunk from the client 104. In some embodiments, the agent 118 requests the client 104 for the at least one chunk. As a result, the file processor 116 receives the at least one chunk from the client 104. According to some embodiments, the plug-in 138 and the browser 134 facilitate transferring the at least one chunk from the client 104 to the file processor 116 of the server 102. At step 218, the at least one chunk is copied to the corresponding location in the virtual file 122 e.g., a chunk is positioned in the memory address space of the virtual file that matches the memory address space in the file. At step 220, the file operation task is executed/processed. At step 222, the executed results are sent to the client 104. In some embodiments, the agent sends the executed/processed data chunks to the client 104.

In some embodiments, an indicia of status for one or more aspects of the upload and/or task may be presented to the user. For example, a status bar may represent an entire file; various colors may represent the upload status of file chunks, the task completion status and/or the like.

At step 224, the client 104 receives the executed/processed data chunks. At step 226, the file is updated, if required. The update may be treated by the client as an incremental update of the file. Thus, the update may be stored as a separate addendum to the file and selectively incorporated into the file. In some embodiments, the browser 134 updates the file 140, if there is a requirement. At step 228, the updated file may be displayed; although, displaying the file is optional. In some embodiments, the user interface module 136 displays the updated file to the user.

The embodiments of the present invention may be embodied as methods, apparatus, electronic devices, and/or computer program products. Accordingly, the embodiments of the present invention may be embodied in hardware and/or in software (including firmware, resident software, micro-code, etc.), which may be generally referred to herein as a "circuit" or "module". Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device. These computer program instructions may also be stored in a computer-usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer-usable or computer-readable medium may be, for example but not limited to, an electronic, magnetic, optical, electromagnetic, infrared, or semiconductor system, apparatus, device, or propagation medium. More specific examples (a non exhaustive list) of the computer-readable medium include the following: hard disks, optical storage devices, a transmission media such as those supporting the Internet or an intranet, magnetic storage devices, an electrical connection having one or more wires, a portable computer diskette, a random access memory (RAM), a read-only memory (ROM), an erasable programmable read-only memory (EPROM or Flash memory), an optical fiber, and a compact disc read-only memory (CD-ROM).

Computer program code for carrying out operations of the present invention may be written in an object oriented programming language, such as Java®, Smalltalk or C++, and the like. However, the computer program code for carrying out operations of the present invention may also be written in conventional procedural programming languages, such as the "C" programming language and/or any other lower level assembler languages. It will be further appreciated that the functionality of any or all of the program modules may also be implemented using discrete hardware components, one or more Application Specific Integrated Circuits (ASICs), or programmed Digital Signal Processors or microcontrollers.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present disclosure and its practical applications, to thereby enable others skilled in the art to best utilize the invention and various embodiments with various modifications as may be suited to the particular use contemplated.

Example Computer System

Figure 3:
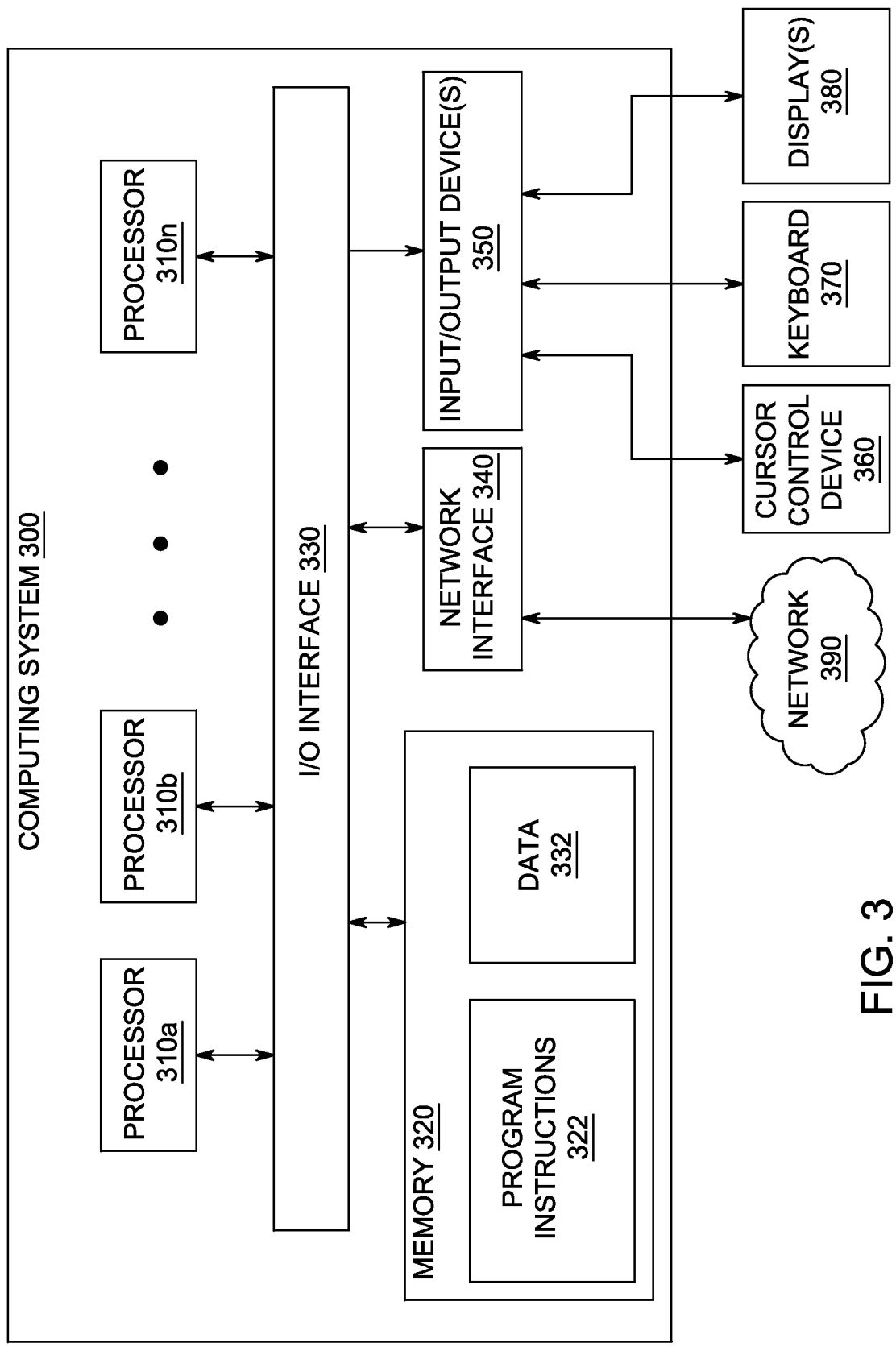
FIG. 3 depicts a computer system that can be utilized in various embodiments of the present invention, according to one or more embodiments.

FIG. 3 depicts a computer system that can be utilized in various embodiments of the present invention, according to one or more embodiments.

Various embodiments of an apparatus and method for performing file services using cloud computing, as described herein, may be executed on one or more computer systems, which may interact with various other devices. One such computer system is computer system 300 illustrated by FIG. 3, which may in various embodiments implement any of the elements or functionality illustrated in FIGS. 1-2. In various embodiments, computer system 300 may be configured to implement methods described above. The computer system 300 may be used to implement any other system, device, element, functionality or method of the above-described embodiments. In the illustrated embodiments, computer system 300 may be configured to implement methods 200, as processor-executable executable program instructions 322 (e.g., program instructions executable by processor(s) 310) in various embodiments.

In the illustrated embodiment, computer system 300 includes one or more processors 310 coupled to a system memory 320 via an input/output (I/O) interface 330. Computer system 300 further includes a network interface 340 coupled to I/O interface 330, and one or more input/output devices 350, such as cursor control device 360, keyboard 370, and display(s) 380. In various embodiments, any of components may be utilized by the system to receive user input described above. In various embodiments, a user interface (e.g., user interface) may be generated and displayed on display 380. In some cases, it is contemplated that embodiments may be implemented using a single instance of computer system 300, while in other embodiments multiple such systems, or multiple nodes making up computer system 300, may be configured to host different portions or instances of various embodiments. For example, in one embodiment some elements may be implemented via one or more nodes of computer system 300 that are distinct from those nodes implementing other elements. In another example, multiple nodes may implement computer system 300 in a distributed manner.

In different embodiments, computer system 300 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In various embodiments, computer system 300 may be a uniprocessor system including one processor 310, or a multiprocessor system including several processors 310 (e.g., two, four, eight, or another suitable number). Processors 310 may be any suitable processor capable of executing instructions. For example, in various embodiments processors 310 may be general-purpose or embedded processors implementing any of a variety of instruction set architectures (ISAs), such as the x96, PowerPC, SPARC, or MIPS ISAs, or any other suitable ISA. In multiprocessor systems, each of processors 310 may commonly, but not necessarily, implement the same ISA.

System memory 320 may be configured to store program instructions 322 and/or data 332 accessible by processor 310. In various embodiments, system memory 320 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing any of the elements of the embodiments described above may be stored within system memory 320. In other embodiments, program instructions and/or data may be received, sent or stored upon different types of computer-accessible media or on similar media separate from system memory 320 or computer system 300.

In one embodiment, I/O interface 330 may be configured to coordinate I/O traffic between processor 310, system memory 320, and any peripheral devices in the device, including network interface 340 or other peripheral interfaces, such as input/output devices 350, In some embodiments, I/O interface 330 may perform any necessary protocol, timing or other data transformations to convert data signals from one components (e.g., system memory 320) into a format suitable for use by another component (e.g., processor 310). In some embodiments, I/O interface 330 may include support for devices attached through various types of peripheral buses, such as a variant of the Peripheral Component Interconnect (PCI) bus standard or the Universal Serial Bus (USB) standard, for example. In some embodiments, the function of I/O interface 330 may be split into two or more separate components, such as a north bridge and a south bridge, for example. Also, in some embodiments some or all of the functionality of I/O interface 330, such as an interface to system memory 320, may be incorporated directly into processor 310.

Network interface 340 may be configured to allow data to be exchanged between computer system 300 and other devices attached to a network (e.g., network 390), such as one or more external systems or between nodes of computer system 300. In various embodiments, network 390 may include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 340 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 350 may, in some embodiments, include one or more display terminals, keyboards, keypads, touchpads, scanning devices, voice or optical recognition devices, or any other devices suitable for entering or accessing data by one or more computer systems 300. Multiple input/output devices 350 may be present in computer system 300 or may be distributed on various nodes of computer system 300. In some embodiments, similar input/output devices may be separate from computer system 300 and may interact with one or more nodes of computer system 300 through a wired or wireless connection, such as over network interface 340.

In some embodiments, the illustrated computer system may implement any of the methods described above, such as the methods illustrated by the flowcharts of FIG. 2. In other embodiments, different elements and data may be included.

Those skilled in the art will appreciate that computer system 300 is merely illustrative and is not intended to limit the scope of embodiments. In particular, the computer system and devices may include any combination of hardware or software that can perform the indicated functions of various embodiments, including computers, network devices, Internet appliances, PDAs, wireless phones, pagers, etc. Computer system 300 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via intercomputer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 300 may be transmitted to computer system 300 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium or via a communication medium. In general, a computer-accessible medium may include a storage medium or memory medium such as magnetic or optical media, e.g., disk or DVD/CD-ROM, volatile or non-volatile media such as RAM (e.g., SDRAM, DDR, RDRAM, SRAM, etc.), ROM, etc.

The methods described herein may be implemented in software, hardware, or a combination thereof, in different embodiments. In addition, the order of methods may be changed, and various elements may be added, reordered, combined, omitted, modified, etc. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

While the foregoing is directed to embodiments of the present invention, other and further embodiments of the invention may be devised without departing from the basic scope thereof, and the scope thereof is determined by the claims that follow.

The invention claimed is:

1. A computer implemented method of performing file services using cloud computing comprising:
   a) receiving, from a client computer, at least one parameter of a file resident on the client computer and a task to be performed upon the file, wherein the task is performed on a portion of the file, wherein the portion of the file comprises less than the entire file;
   b) creating a virtual file based on the at least one parameter of the file, wherein the virtual file is a representation of the file by comprising a same memory extent as the file;
   c) dividing the virtual file into a plurality of data chunks, wherein each chunk represents a range of memory space within the extent of the file;
   d) identifying byte range within the virtual file associated with the task and at least one corresponding data chunk from the plurality of data chunks that is within the byte range, wherein the task is performed on the portion of the file within the identified byte range;
   e) requesting the at least one corresponding data chunk from the client computer,
   f) receiving the at least one corresponding data chunk from the client
   g) copying the at least one corresponding data chunk into the virtual file;
   h) processing at least one corresponding data chunk in accordance with the task; and
   i) sending the processed at least one corresponding data chunk to the client computer.

2. The method of claim 1, wherein the plurality of chunks are mutually exclusive and jointly exhaustive of a memory extent of the file.

3. The method of claim 1, wherein identifying the at least one corresponding data chunk comprises executing file read functions for fetching a byte range within the file.

4. The method of claim 1, wherein the at least one parameter comprises a file size, a file name or memory extent of the file.

5. The method of claim 1 wherein the processed at least one data chunk is used by the client computer as an incremental update to the file.

6. The method of claim 1 wherein steps a) through i) are performed on a cloud-based server.

7. The method of claim 6 further comprising:
sending, from a client computer, the at least one parameter of the file and a task to be performed upon the file.

8. A system for performing file services on cloud computing comprising:
an agent for receiving, from a client computer, at least one parameter of a file resident on a client and a task to be performed upon the file, wherein the task is performed on a portion of the file, wherein the portion of the file comprises less than the entire file;
a virtual file generator for creating a virtual file based on the at least one parameter of the file, wherein the virtual file is a representation of the file by comprising a same memory extent as the file and dividing the virtual file into a plurality of data chunks, wherein each chunk represents a range of memory space within the extent of the file; and
a file processor for identifying byte range associated with the task and at least one corresponding data chunk from the plurality of data chunks, wherein the task is performed on the portion of the file within the identified byte range, receiving the at least one corresponding data chunk from a client, copying the at least one corresponding data chunk into the virtual file, processing the least one corresponding data chunk in accordance with the task, and sending the processed at least one corresponding data chunk to the client computer.

9. The system of claim 8, wherein the at least one parameter comprises a file size, a file name, and a memory extent of the file.

10. The system of claim 9, wherein the plurality of data chunks are mutually exclusive and jointly exhaustive of a memory extent of the file.

11. The system of claim 8 wherein the processed at least one corresponding data chunk is used by the client computer as an incremental update to the file.

12. The system of claim 8 wherein the agent, virtual file generator and file processor are a portion of a cloud-based server.

13. The system of claim 12 wherein the client computer is coupled to the cloud-based server.

14. A non-transient computer readable medium for storing computer instructions that, when executed by at least one processor cause the at least one processor to perform a method of performing file services using cloud computing comprising:
a) receiving, from a client computer, at least one parameter of a file resident on the client computer and a task to be performed upon the file, wherein the task is performed on a portion of the file, wherein the portion of the file comprises less than the entire file;
b) creating a virtual file based on the at least one parameter of the file, wherein the virtual file is a representation of the file by comprising a same memory extent as the file;
c) dividing the virtual file into a plurality of data chunks, wherein each chunk represents a range of memory space within the extent of the file;
d) identifying byte range within the virtual file associated with the task and at least one corresponding data chunk from the plurality of data chunks that is within the byte range, wherein the task is performed on the portion of the file within the identified byte range;
e) requesting the at least one corresponding data chunk from the client computer,
f) receiving the at least one corresponding data chunk from the client
g) copying the at least one corresponding data chunk into the virtual file;
h) processing at least one corresponding data chunk in accordance with the task; and
i) sending the processed at least one corresponding data chunk to the client computer.

15. The method of claim 14, wherein the plurality of chunks are mutually exclusive and jointly exhaustive of a memory extent of the file.

16. The method of claim 14, wherein identifying the at least one corresponding data chunk comprises executing file read functions for fetching a byte range within the file.

17. The method of claim 14, wherein the at least one parameter comprises a file size, a file name or memory extent of the file.

18. The method of claim 14 wherein one corresponding data chunk is used by the client computer as an incremental update to the file.

19. The method of claim 14 wherein steps a) through i) are performed on a cloud-based server.

* * * * *